United States Patent
Sakuda et al.

(10) Patent No.: US 10,053,135 B2
(45) Date of Patent: Aug. 21, 2018

(54) STEERING APPARATUS

(71) Applicants: JTEKT CORPORATION, Osaka-shi, Osaka (JP); TOYOTA JIDOSHA KABUSHIKI KAISHA, Toyota-shi, Aichi-ken (JP)

(72) Inventors: Masayoshi Sakuda, Kashihara (JP); Tomonori Sugiura, Yamatokoriyama (JP); Tatsuro Kubota, Shiki-gun (JP); Shoji Ishimura, Kashihara (JP); Shigeru Hoshino, Toyota (JP)

(73) Assignees: JTEKT CORPORATION, Osaka-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 5 days.

(21) Appl. No.: 15/468,786

(22) Filed: Mar. 24, 2017

(65) Prior Publication Data
US 2017/0291632 A1 Oct. 12, 2017

(30) Foreign Application Priority Data
Apr. 7, 2016 (JP) ................................ 2016-077457

(51) Int. Cl.
*B62D 1/19* (2006.01)
*B62D 1/184* (2006.01)
*B62D 1/189* (2006.01)

(52) U.S. Cl.
CPC ............. *B62D 1/195* (2013.01); *B62D 1/184* (2013.01); *B62D 1/189* (2013.01)

(58) Field of Classification Search
CPC ......... B62D 1/195; B62D 1/189; B62D 1/184
See application file for complete search history.

(56) References Cited

U.S. PATENT DOCUMENTS

| | | | |
|---|---|---|---|
| 7,954,852 B2* | 6/2011 | Ueno ....................... | B62D 1/16 280/775 |
| 8,997,602 B2* | 4/2015 | Tanaka ................... | B62D 1/184 280/775 |
| 2005/0223838 A1* | 10/2005 | Higashino ............ | B21D 43/285 74/492 |

(Continued)

FOREIGN PATENT DOCUMENTS

JP 2015-182614 A 10/2015

*Primary Examiner* — Darlene P Condra
(74) *Attorney, Agent, or Firm* — Oliff PLC (57) ABSTRACT

A support shaft includes a first supported portion and a second supported portion supported by respective support holes of a pair of fastened portions. The support shaft includes a large-diameter portion including the first supported portion, a small-diameter portion including the second supported portion and having a diameter smaller than the large-diameter portion, and a stepped portion formed between the large-diameter portion and the small-diameter portion. The small-diameter portion includes a tapered portion provided in the small-diameter portion so as to be adjacent to the stepped portion and having a diameter gradually decreasing toward the stepped portion, a first to-be-broken portion placed in a smallest-diameter portion of the tapered portion so as to be broken at a time of a secondary collision, and a second to-be-broken portion placed adjacent to the second supported portion so as to be broken at the time of the secondary collision.

2 Claims, 8 Drawing Sheets (56) References Cited

U.S. PATENT DOCUMENTS

| | | | |
|---|---|---|---|
| 2013/0160596 A1* | 6/2013 | Tanaka | B62D 1/185 74/493 |
| 2015/0096404 A1* | 4/2015 | Martinez | B62D 1/195 74/492 |
| 2015/0182614 A1 | 7/2015 | Locht et al. | |
| 2015/0266497 A1* | 9/2015 | Yoshihara | B62D 1/184 74/493 |
| 2015/0266499 A1 | 9/2015 | Yoshihara et al. | |

* cited by examiner

RELATED ART

STEERING APPARATUS

INCORPORATION BY REFERENCE

The disclosure of Japanese Patent Application No. 2016-077457 filed on Apr. 7, 2016 including the specification, drawings and abstract is incorporated herein by reference in its entirety.

BACKGROUND

1. Technical Field

The present disclosure relates to a steering apparatus.

2. Description of Related Art

Figure 8:
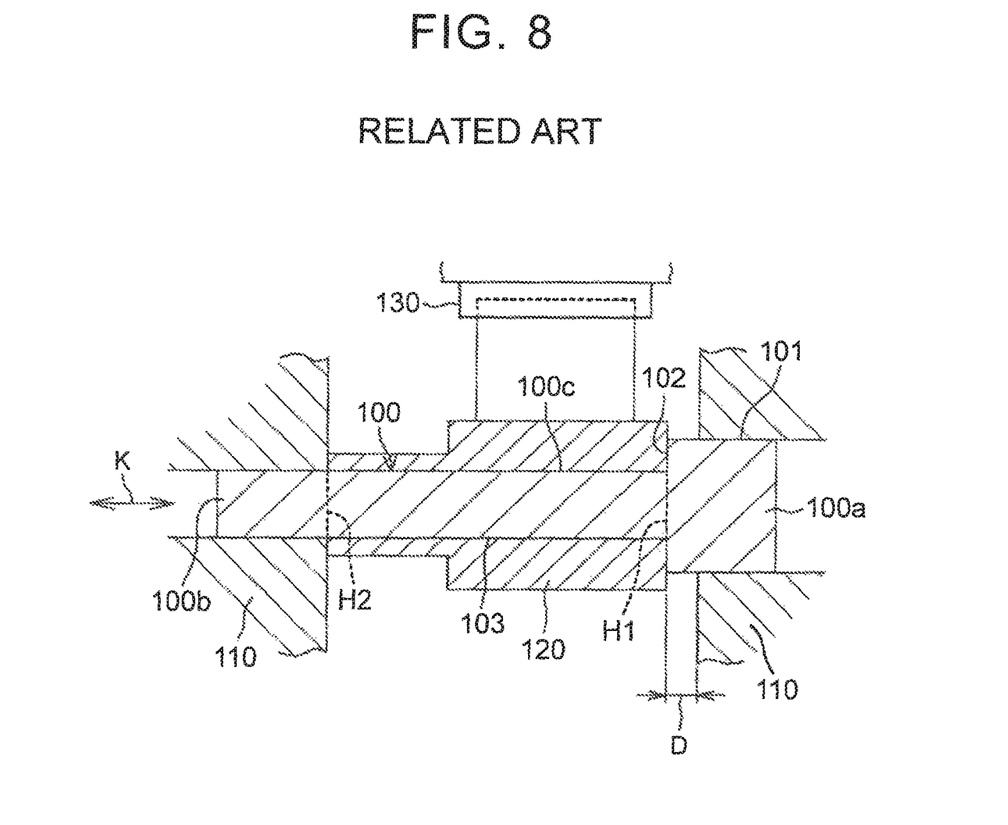
FIG. 8 is a sectional view of a structure around a conventional support shaft.

As illustrated in FIG. 8, in Japanese Patent Application Publication No. 2015-182614 (JP 2015-182614 A), a locking member 120 rotatably supported by a lower jacket 110 via a support shaft 100 is engaged with a lock plate 130 supported by an upper jacket (not shown), thereby increasing the retentivity of a telescopic lock. The support shaft 100 includes: a large-diameter portion 101 placed in one end 100a thereof in a support shaft direction K; and a small-diameter portion 103 extending from the large-diameter portion 101 toward the other-end-100b side in the support shaft direction K via a stepped portion 102. The support shaft 100 is supported by a lower jacket 110 at both the one end 100a and the other end 100b in the support shaft direction K. The locking member 120 is supported such that the locking member 120 is outwardly engaged with the small-diameter portion 103 in an intermediate part 100c between the one end 100a and the other end 100b in the support shaft direction K.

In JP 2015-182614 A, as the locking member 120 receives an impact load at the time of a secondary collision, the support shaft 100 is broken by shearing at a first to-be-broken portion H1 and a second to-be-broken portion H2 placed on both sides of the intermediate part 100c in the support shaft direction K, so as to absorb an impact energy.

SUMMARY

However, the large-diameter portion 101 of the one end 100a of the support shaft 100 is only partially supported by the lower jacket 110 in the support shaft direction K, and the lower jacket 110 is separated from the first to-be-broken portion H1 only by a predetermined distance D in the support shaft direction K. This is to restrain the locking member 120 from interfering with the lower jacket 110 at the time when the support shaft 100 is broken at the time of a secondary collision.

The first to-be-broken portion H1 separated from the lower jacket 110 in the support shaft direction K may receive a bending stress at the time of a secondary collision, so as to be broken by bending, not by shearing. The first to-be-broken portion H1 broken by bending and the second to-be-broken portion H2 broken by shearing cannot achieve simultaneous breakage. This may cause variations in impact absorption load. The present disclosure provides a steering apparatus that can obtain a stable impact absorption load.

A steering apparatus according to an aspect of the disclosure includes: a column jacket including a steering shaft stretchable in a column axial direction, an outer jacket including a slit and a pair of fastened portions placed on both sides of the slit, and an inner jacket fitted to the outer jacket, the column jacket being configured to rotatably support the steering shaft and to be stretchable in the column axial direction; a fastening mechanism including a fastening shaft passed through fastening shaft passing holes of the pair of fastened portions, and an operating lever rotating the fastening shaft, the fastening mechanism being configured to fasten the pair of fastened portions via the fastening shaft so that the outer jacket holds the inner jacket; a first tooth formation member forming first teeth and fixed to the inner jacket; a support shaft including a first supported portion and a second supported portion supported by respective support holes of the pair of fastened portions; and a second tooth formation member including a second tooth engaging with a corresponding one of the first teeth, the second tooth formation member being rotatably supported by the support shaft so as to rotate according to an operation of the operating lever such that the second tooth engages with or disengages from the corresponding one of the first teeth. The support shaft includes a large-diameter portion partially including the first supported portion in a support shaft direction, a small-diameter portion partially including the second supported portion in the support shaft direction and having a diameter smaller than the large-diameter portion, and a stepped portion formed between the large-diameter portion and the small-diameter portion. The small-diameter portion includes a tapered portion provided in the small-diameter portion so as to be adjacent to the stepped portion and having a diameter gradually decreasing toward the stepped portion, a first to-be-broken portion placed in a smallest-diameter portion of the tapered portion so as to be broken at a time of a secondary collision, and a second to-be-broken portion placed adjacent to the second supported portion so as to be broken at the time of the secondary collision.

In the above aspect, since the first to-be-broken portion is provided in the smallest-diameter portion of the tapered portion adjacent to the stepped portion and having a diameter gradually decreasing toward the stepped portion, a stress concentrates on the first to-be-broken portion. On this account, the first to-be-broken portion is broken by shearing, so that the first to-be-broken portion and the second to-be-broken portion are broken by shearing at the same time. This makes it possible to obtain a stable impact absorption load.

In the above aspect, the steering apparatus may further include a reinforcing member configured to be fitted to an outer peripheral surface of the small-diameter portion between the first to-be-broken portion and the second to-be-broken portion, the reinforcing member being formed in a tubular shape and having a strength higher than a strength of the support shaft. The second tooth formation member may be supported by the support shaft via the reinforcing member.

In the above configuration, there is a strength difference between a part of the support shaft to which the reinforcing member is fitted and each of the to-be-broken portions. This promotes the breakage of the to-be-broken portions by shearing at the time of a secondary collision.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
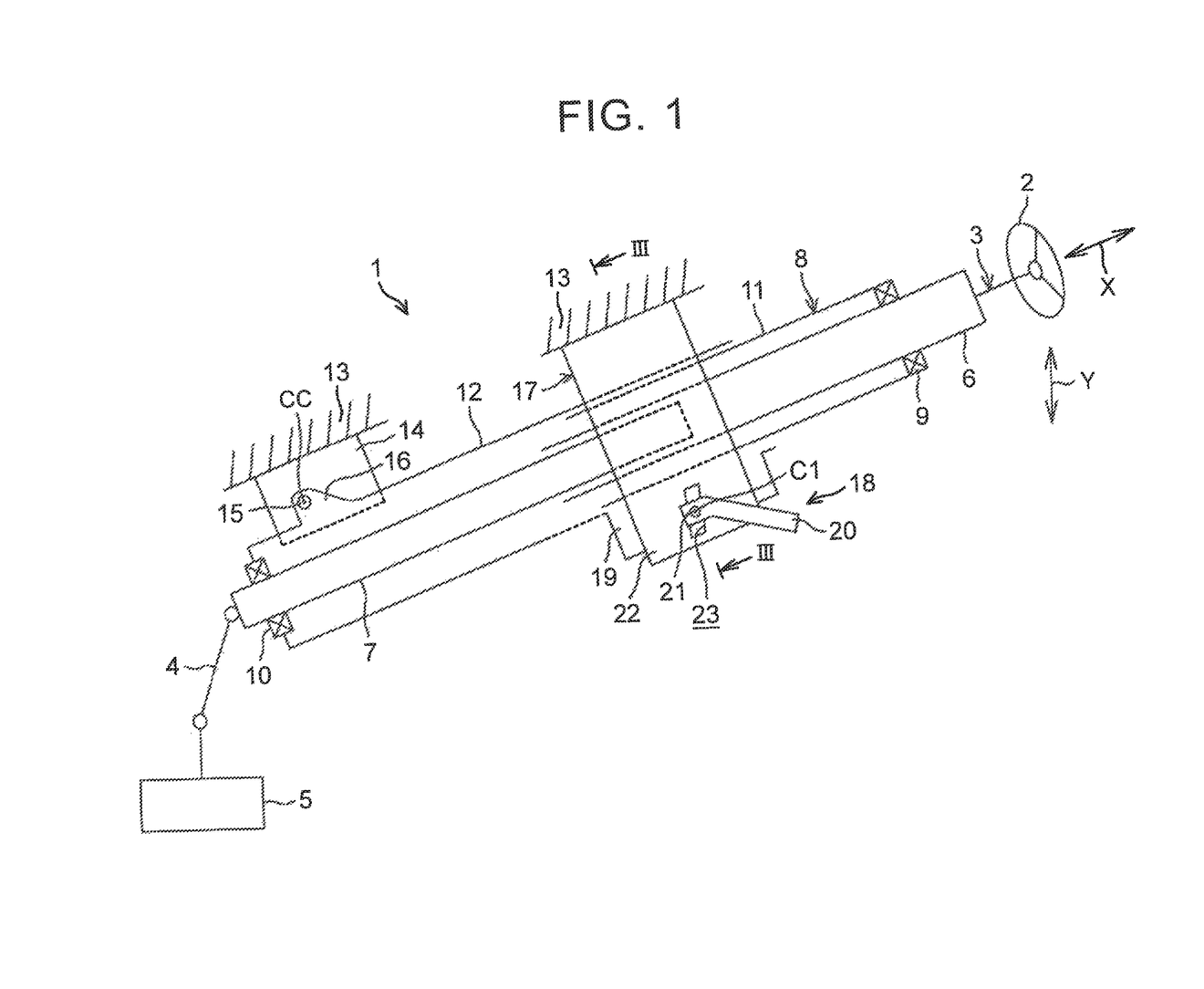
FIG. 1 is a partially breaking schematic side view illustrating a schematic configuration of a steering apparatus according to a first embodiment of the present disclosure.

An embodiment that embodies the present disclosure is described below with reference to the drawings. (First Embodiment) FIG. 1 is a partially breaking schematic side view illustrating a schematic configuration of a steering apparatus according to the first embodiment of the present disclosure. Referring now to FIG. 1, the steering apparatus 1 includes: a steering shaft 3 having one end (an axially upper end) to which a steering member 2 such as a steering wheel is connected; and a steering operation mechanism 5 connected to the steering shaft 3 via an intermediate shaft 4 or the like.

The steering operation mechanism 5 is, for example, a rack-and-pinion mechanism that steers steered wheels (not shown) in association with steerage of the steering member 2. A rotation of the steering member 2 is transmitted to the steering operation mechanism 5 via the steering shaft 3, the intermediate shaft 4, and so on. Further, the rotation transmitted to the steering operation mechanism 5 is converted into an axial movement of a rack shaft (not shown). Hereby, the steered wheels are steered.

The steering shaft 3 includes a tubular upper shaft 6 and a tubular lower shaft 7 that are fitted to each other by spline-fitting or serration-fitting, for example, in a relatively slidable manner. The steering member 2 is connected to one end of the upper shaft 6. Further, the steering shaft 3 is stretchable in a column axial direction X, which is a central axis direction of the steering shaft 3. The steering apparatus 1 includes a hollow column jacket 8 that supports the steering shaft 3 rotatably. The steering shaft 3 is inserted into the column jacket 8, so as to be rotatably supported by the column jacket 8 via a plurality of bearings 9, 10.

The column jacket 8 includes a tubular inner jacket 11 such as an upper jacket, and a tubular outer jacket 12 such as a lower jacket, for example. The inner jacket 11 and the outer jacket 12 are fitted to each other in a relatively rotatable manner. The column jacket 8 is stretchable in the column axial direction X. The inner jacket 11 on an upper side is connected, via the bearing 9, to an upper shaft 6 so as to be movable together in the column axial direction X. The outer jacket 12 on a lower side rotatably supports the lower shaft 7 via the bearing 10. The steering apparatus 1 includes: a fixed bracket 14 fixed to a vehicle body 13; a tilt central shaft 15 supported by the fixed bracket 14; and a column bracket 16 fixed to an outer peripheral surface of the outer jacket 12 and rotatably supported by the tilt central shaft 15. The column jacket 8 and the steering shaft 3 can pivot (tilt) in a tilt direction Y with a tilt center CC being taken as a fulcrum. The tilt center CC is a central axis of the tilt central shaft 15.

When the steering shaft 3 and the column jacket 8 are pivoted (tilted) around the tilt center CC, a position of the steering member 2 can be adjusted (so-called tilt adjustment). Further, when the steering shaft 3 and the column jacket 8 are extended and contracted in the column axial direction X, the position of the steering member 2 can be adjusted (so-called telescopic adjustment).

Figure 2:
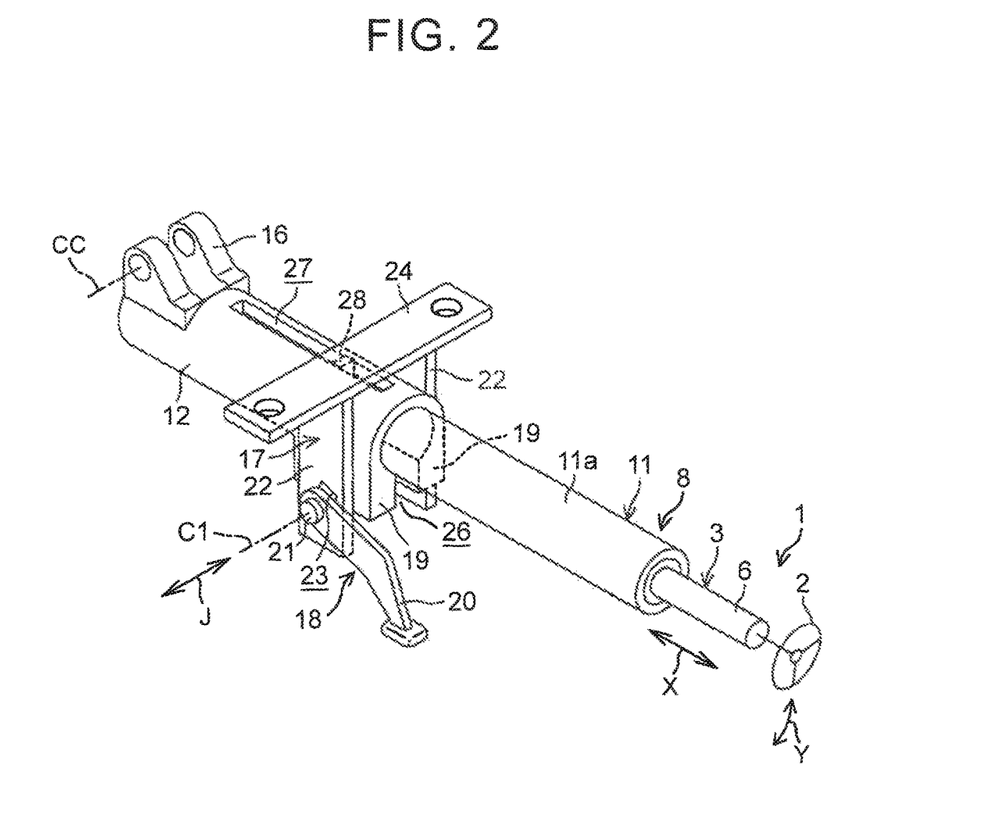
FIG. 2 is a schematic perspective view of the steering apparatus according to the first embodiment.

The steering apparatus 1 includes a bracket 17 fixed to the vehicle body 13, and a fastening mechanism 18 that achieves a tilt lock and a telescopic lock by fastening a pair of fastened portions 19, which are made of the same material in an integrated manner on an upper side of the outer jacket 12 in the column axial direction X. As illustrated in FIG. 1 and FIG. 2 that is a schematic perspective view, the fastening mechanism 18 includes an operating lever 20 as an operating member that a driver rotates, and a fastening shaft 21 that is rotatable together with the operating lever 20 in an integrated manner. A central axis C1 of the fastening shaft 21 corresponds to a center of rotation of the operating lever 20.

As illustrated in FIG. 2, the outer jacket 12 forms a slit 26 extending downward from an upper end in the column axial direction X. The pair of fastened portions 19 are placed on both sides of the slit 26. By clamping the pair of fastened portions 19, a diameter of the outer jacket 12 can be reduced elastically. The outer jacket 12 has a guide groove 27 extending in the column axial direction X. A guided protrusion 28 fixed to the inner jacket 11 is fitted to the guide groove 27. The guide groove 27 guides an axial movement of the inner jacket 11 via the guided protrusion 28, and restricts a rotation of the inner jacket 11 relative to the outer jacket 12. Further, due to the fitting of the guide groove 27 and the guided protrusion 28, falling-off of the inner jacket 11 from the outer jacket 12 is prevented.

The fastening mechanism 18 achieves a tilt lock by fastening the bracket 17 with respect to the pair of fastened portions 19 of the outer jacket 12 via the fastening shaft 21. Further, the fastening mechanism 18 achieves a telescopic lock such that the inner jacket 11 is clamped immovably in the column axial direction X by the outer jacket 12 that is reduced in diameter by clamping the pair of fastened portions 19 of the outer jacket 12. Hereby, the position of the steering member 2 is fixed to the vehicle body 13 (see FIG. 1).

Figure 3:
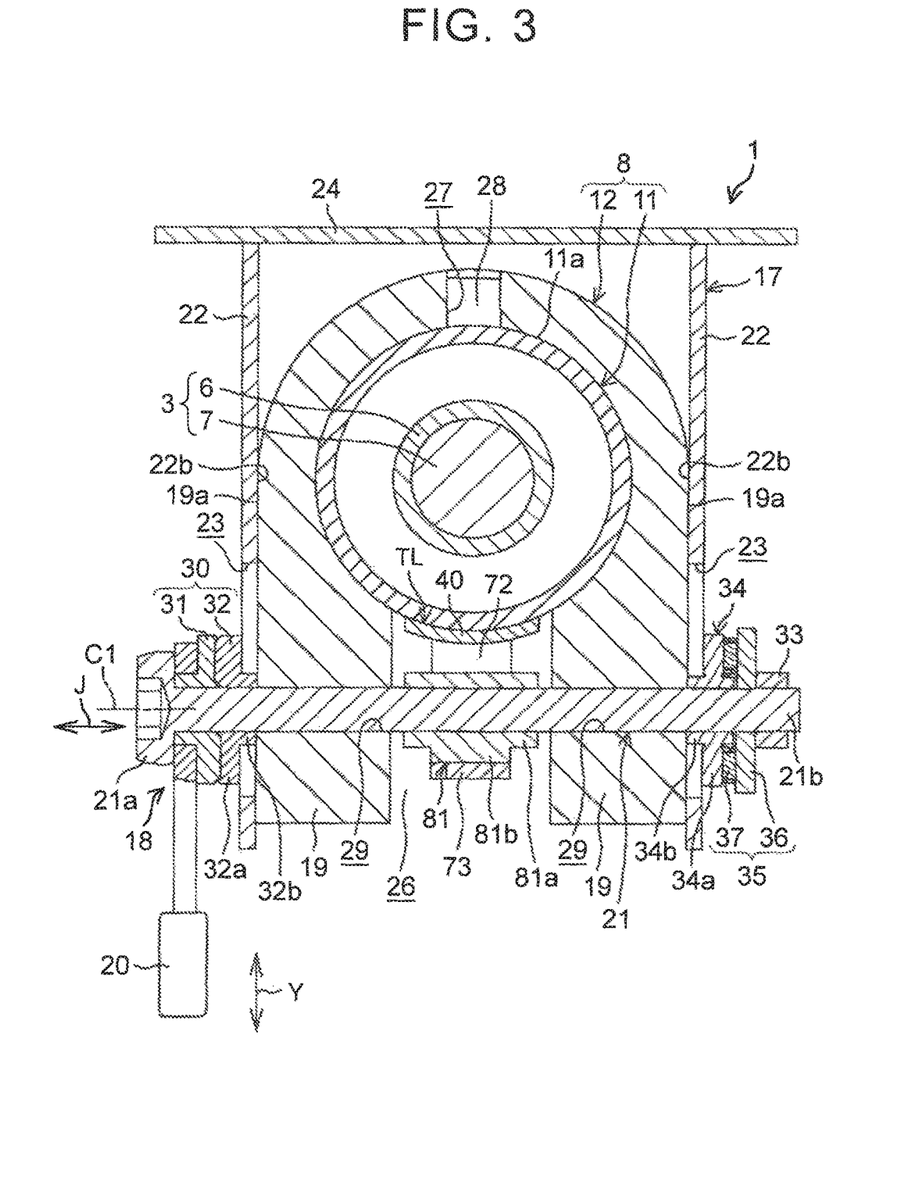
FIG. 3 is a sectional view of an essential part of the steering apparatus according to the first embodiment, and corresponds to a sectional view taken along a line III-III in FIG. 1.

The fastening shaft 21 is passed through tilt elongate holes 23 respectively provided in a pair of side plates 22 (only one side plate 22 is illustrated in FIG. 1) of the bracket 17 so as to extend in the tilt direction Y. As illustrated in FIG. 3, the bracket 17 includes a mounting plate 24 attached to the vehicle body 13, and a pair of side plates 22 extending downward in the tilt direction Y from both ends of the mounting plate 24. The pair of fastened portions 19 of the outer jacket 12 are placed between the pair of side plates 22, and each have a plate shape along an inner surface 22b of a corresponding side plate 22. The inner surface 22b of each of the side plates 22 is opposed to an outer surface 19a of a corresponding fastened portion 19.

Each of the fastened portions 19 of the outer jacket 12 has a fastening shaft passing hole 29, which is a round hole through which the fastening shaft 21 is passed. At the time of tilt adjustment, the fastening shaft 21, the outer jacket 12, the inner jacket 11, and the steering shaft 3 move together in the tilt direction Y. The fastening shaft 21 is constituted by a bolt passing through the tilt elongate holes 23 of both side plates 22 of the bracket 17 and the fastening shaft passing holes 29 of both fastened portions 19 of the outer jacket 12. A larger-diameter head 21a provided in one end of the fastening shaft 21 is fixed so as to be rotatable together with the operating lever 20 in an integrated manner.

The fastening mechanism 18 is provided between the head 21a of the fastening shaft 21 and one side plate 22, and further includes a force conversion mechanism 30 that converts an operation torque of the operating lever 20 into an axial force (a fastening torque to fasten the pair of side plates 22) of the fastening shaft 21. The force conversion mechanism 30 includes: a rotating cam 31 which is connected to the operating lever 20 so as to rotate together therewith in an integrated manner and which is configured such that its movement relative to the fastening shaft 21 in a fastening shaft direction J is restricted; and one fastening member 32, which is a non-rotatable cam that achieves cam engagement with the rotating cam 31 so as to fasten the one side plate 22.

The fastening mechanism 18 further includes a nut 33 engaged threadedly with a threaded portion 21b of the other end of the fastening shaft 21, the other fastening member 34 that fastens the other side plate 22, and an intervening member 35 provided between the other fastening member 34 and the nut 33. The intervening member 35 includes a washer 36 provided between the nut 33 and the other fastening member 34; and a needle-shaped roller bearing 37 provided between the washer 36 and the other fastening member 34.

The other fastening member 34 and the intervening member 35 are provided between the nut 33 and the other side plate 22 of the bracket 17. The rotating cam 31, the one fastening member 32 (the non-rotatable cam), the other fastening member 34, and the intervening member 35 are supported by an outer peripheral surface of the fastening shaft 21. The one fastening member 32 (the non-rotatable cam) and the other fastening member 34 include respective fastening plate portions 32a, 34a that fasten their corresponding side plates 22, and respective boss portions 32b, 34b fitted to their corresponding tilt elongate holes 23. Rotations of the fastening members 32, 34 are restricted due to fitting of respective boss portions 32b, 34b to their corresponding tilt elongate holes 23.

Further, the one fastening member 32 (the non-rotatable cam) and the other fastening member 34 are supported by the fastening shaft 21 so as to be movable in the fastening shaft direction J. Along with the rotation of the operating lever 20 toward a lock direction, the rotating cam 31 rotates relative to the one fastening member 32 (the non-rotatable cam). Hereby, the one fastening member 32 is moved in the fastening shaft direction J, so that the pair of side plates 22 of the bracket 17 is clamped and fastened between the fastening members 32, 34 (the fastening plate portions 32a, 34a thereof).

Hereby, each of the side plates 22 of the bracket 17 fastens its corresponding fastened portion 19 of the outer jacket 12. As a result, the movement of the outer jacket 12 in the tilt direction Y is restricted, so that a tilt lock is attained. Further, when both fastened portions 19 are fastened, the outer jacket 12 is elastically reduced in diameter, so as to fasten the inner jacket 11. Hereby, the movement of the inner jacket 11 in the column axial direction X is restricted, so that a telescopic lock is attained.

Figure 4:
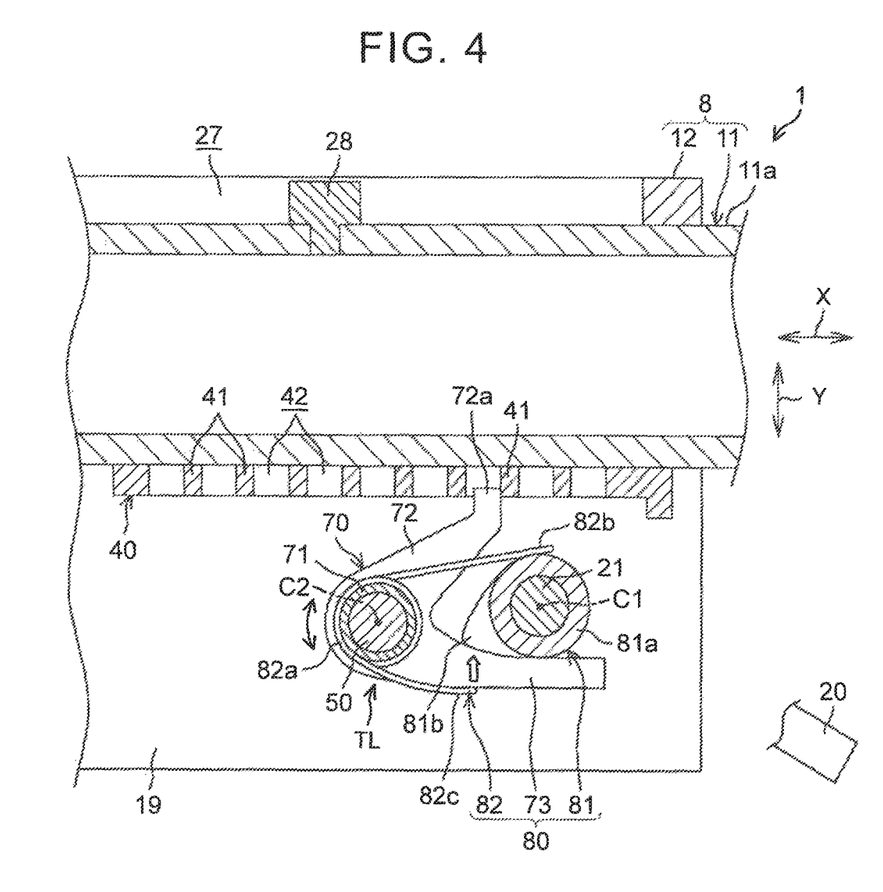
FIG. 4 is a sectional view of an essential part of the steering apparatus according to the first embodiment, and illustrates a locked state of a tooth lock mechanism.
Figure 5:
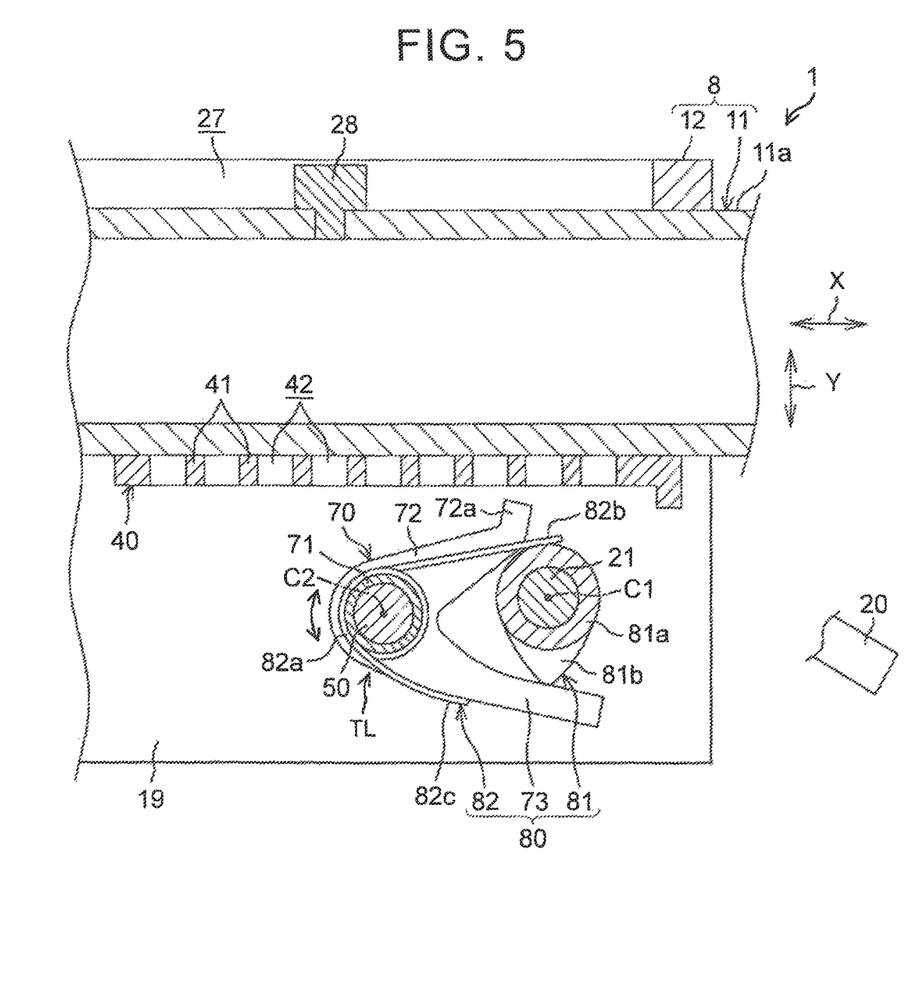
FIG. 5 is a sectional view of an essential part of the steering apparatus according to the first embodiment, and illustrates an unlocked state of the tooth lock mechanism.

As illustrated in FIGS. 4 and 5, the steering apparatus 1 includes a tooth lock mechanism TL to improve the retentivity of the telescopic lock. FIG. 4 illustrates a locked state of the tooth lock mechanism TL, and FIG. 5 illustrates an unlocked state (a lock released state) of the tooth lock mechanism TL. The tooth lock mechanism TL includes a first tooth formation member 40 fixed to an outer peripheral surface 11a of the inner jacket 11, a support shaft 50 supported by the pair of fastened portions 19, a second tooth formation member 70 rotatably supported by the support shaft 50, and an association mechanism 80 that associates a rotation of the fastening shaft 21 with a rotation of the second tooth formation member 70.

Figure 6:
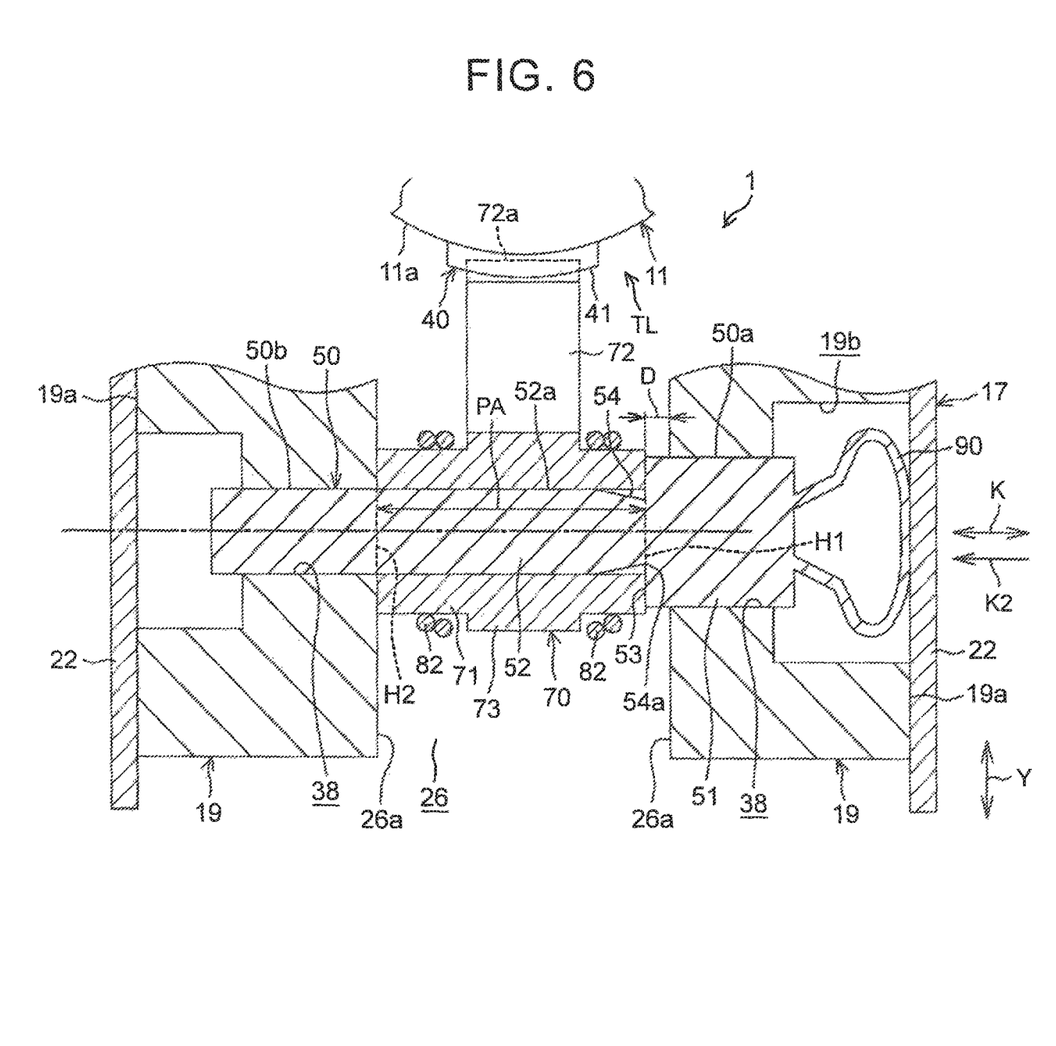
FIG. 6 is a sectional view of an essential part of the steering apparatus according to the first embodiment, and illustrates a mechanism that supports a second tooth formation member of the tooth lock mechanism.

The first tooth formation member 40 has a plurality of first teeth 41 such that the first teeth 41 are arranged at predetermined intervals in the column axial direction X. A plurality of grooves 42 may be formed on an elongate plate as a material such that the grooves 42 are formed at predetermined intervals in the column axial direction X, and each of the first teeth 41 may be formed between adjacent grooves 42. As illustrated in FIG. 6, the support shaft 50 includes, at both ends of the support shaft 50 in a support shaft direction K, which is a central axis direction, thereof, a first supported portion 50a and a second supported portion 50b directly supported by support holes 38 of their corresponding fastened portions 19.

The support shaft 50 includes: a large-diameter portion 51 partially including the first supported portion 50a in the support shaft direction K; a small-diameter portion 52 partially including the second supported portion 50b in the support shaft direction K and having a diameter smaller than the large-diameter portion 51; and a stepped portion 53 constituted by an axially perpendicular surface formed between the large-diameter portion 51 and the small-diameter portion 52. The small-diameter portion 52 includes: a tapered portion 54 adjacent to the stepped portion 53 and gradually decreased in diameter toward the stepped portion 53; a first to-be-broken portion H1 placed in a smallest-diameter portion 54a of the tapered portion 54 so as to be broken by shearing at the time of a secondary collision; and a second to-be-broken portion H2 adjacent to the second supported portion 50b so as to be broken by shearing at the time of a secondary collision.

The first supported portion 50a supported by the support hole 38 of one fastened portion 19 (a right one in FIG. 6) is placed in a part of the large-diameter portion 51 in the support shaft direction K. That is, a remaining part other than the part of the large-diameter portion 51 enters the slit 26. On this account, in the support shaft direction K, a position of an inner surface 26a of the slit 26 on the one-fastened-portion-19 side is separated from a position of the first to-be-broken portion H1 only by a predetermined distance D.

A biasing member 90 provided integrally with the large-diameter portion 51 of the support shaft 50 is provided between the large-diameter portion 51 of the support shaft 50 and its opposed side plate 22. The biasing member 90 biases the support shaft 50 by a reaction force to press the side plate 22, in a biasing direction K2, which is toward the second-supported-portion-50b side in the support shaft direction K. The biasing member 90 is accommodated in a receptacle recessed portion 19b provided on an outer surface 19a of the one fastened portion 19. The receptacle recessed portion 19b communicates with the support hole 38 and has a diameter larger than the support hole 38.

A biasing force by the biasing member 90 is received by an inner surface 26a of the slit 26 on the other-fastened-portion-19 side (a left side in FIG. 6) via the stepped portion 53 and a boss portion 71 of the second tooth formation member. On an outer peripheral surface 52a of the small-diameter portion 52 of the support shaft 50, the first to-be-broken portion H1 and the second to-be-broken portion H2 are placed at positions on both sides of a predetermined region PA where the boss portion 71 of the second tooth formation member 70 is fitted.

At the time of a secondary collision, a predetermined impact load or more is applied from the steering shaft 3 to the second tooth formation member 70 via the inner jacket 11 and the first tooth formation member 40, so that the support shaft 50 breaks at the first to-be-broken portion H1 and the second to-be-broken portion H2. As illustrated in FIGS. 4 and 6, the second tooth formation member 70 includes the boss portion 71 that surrounds the outer peripheral surface of the support shaft 50, and a second tooth formation arm 72 extending in a projecting manner from an outer peripheral surface of the boss portion 71 and having a distal end provided with a second tooth 72a that can engage with the first tooth 41.

As illustrated in FIG. 4, the association mechanism 80 includes: a cam member 81 connected to the fastening shaft 21 so as to be rotatable together therewith in an integrated manner; a cam follower arm 73 provided so as to be rotatable together with the second tooth formation member 70 in an integrated manner and following the cam member 81; and a biasing member 82 that biases the second tooth formation member 70 in a rotating manner via the cam follower arm 73 in a direction where the second tooth 72a engages with the first tooth 41. The cam member 81 includes: a boss portion 81a fitted to an outer peripheral surface of the fastening shaft 21; and a cam projection 81b projecting radially outwardly from the boss portion 81a.

The biasing member 82 is constituted by a torsion spring, for example. That is, the biasing member 82 includes: a coiled portion 82a that surrounds the boss portion 71 of the second tooth formation member 70; a first engagement portion 82b that extends from the coiled portion 82a so as to engage with an outer peripheral surface of the boss portion 81a of the cam member 81; and a second engagement portion 82c that engages with the cam follower arm 73. The biasing member 82 biases the second tooth formation member 70 in a rotating manner in a counterclockwise direction in FIG. 4 (indicate by a blank arrow in FIG. 4). In a state where the second tooth 72a of the second tooth formation member 70 biased by the biasing member 82 so as to rotate counterclockwise engages with the first tooth 41, a tooth lock is attained as illustrated in FIG. 4.

That is, when the operating lever 20 and the fastening shaft 21 are rotated in a lock direction (a clockwise direction in FIG. 5) around the central axis C1 of the fastening shaft 21 from an unlocked state illustrated in FIG. 5, the cam projection 81b permits a counterclockwise rotation of the can follower arm 73 around a central axis C2 of the support shaft 50. Because of this, due to the action of the biasing member 82, the second tooth formation member 70 rotates counterclockwise, so that the second tooth 72a engages with the first tooth 41 as illustrated in FIG. 4. Hereby, a tooth lock is attained.

In the meantime, when the operating lever 20 is rotated in an unlocking direction (counterclockwise in FIG. 4) from the locked state illustrated in FIG. 4, the cam projection 81b rotates the second tooth formation member 70 clockwise around the central axis C2 via the cam follower arm 73 against the biasing member 82, as illustrated in FIG. 5. Hereby, the second tooth 72a is disengaged from the first tooth 41, so that the tooth lock is released.

The present embodiment is intended to achieve simultaneous breakage of the first to-be-broken portion H1 and the second to-be-broken portion H2 of the support shaft 50 at the time of a secondary collision. However, only a part of the large-diameter portion 51 in the support shaft direction K is supported as the first supported portion 50a by its corresponding support hole 38 of its corresponding fastened portion 19, and because of this, the first to-be-broken portion H1 is separated from its corresponding fastened portion 19 only by the predetermined distance D in the support shaft direction K. On this account, if the tapered portion 54 characterizing the present embodiment is not provided, there is such a concern that the first to-be-broken portion H1 receives a bending stress and breaks not by shearing but by bending at the time of a secondary collision.

In the present embodiment, in order to wipe out the concern, the first to-be-broken portion H1 is provided in the smallest-diameter portion 54a of the tapered portion 54 adjacent to the stepped portion 53 and having a diameter gradually decreasing toward the stepped portion 53. This makes it possible to concentrate the stress to the first to-be-broken portion H1 at the time of a secondary collision, so that the first to-be-broken portion H1 can be broken by shearing. This makes it possible to achieve simultaneous breakage of the first to-be-broken portion H1 and the second to-be-broken portion H2 by shearing. As a result, an impact absorption load at the time of a secondary collision can be stabilized.

In order to successfully set the strength of the first to-be-broken portion H1 and an inclination degree of the tapered portion 54, it is preferable that an arrangement length of the tapered portion 54 in terms of the support shaft direction K be not more than one thirds of a distance between the to-be-broken portions H1, H2 (corresponding to a length of the predetermined region PA of the support shaft 50 in the support shaft direction K). More specifically, it is preferable that the inclination degree of the tapered portion 54 be set such that, in a case where the arrangement length of the tapered portion 54 is 2 to 8 mm, for example, a radius of the smallest-diameter portion 54a of the tapered portion 54 be smaller, by about 0.05 to 0.5 mm, than a radius of a part of the small-diameter portion 52 where the tapered portion 54 is not provided. As such, by forming the tapered portion 54 with a gradual inclination, it is possible to avoid extreme stress concentration to the first to-be-broken portion H1 and to restrain a large decrease of a shearing load in the first to-be-broken portion H1.

Although not illustrated herein, in order to restrain extreme stress concentration and to secure easiness of machining, an R-chamfer having a curvature radius of around 0.1 to 0.3 mm may be formed, for example, at a corner formed between the stepped portion 53 and the tapered portion 54. (Second Embodiment) FIG. 7 is a sectional view of an essential part of a steering apparatus 1P according to the second embodiment of the present disclosure, and illustrates a mechanism that supports a second tooth formation member 70 of a tooth lock mechanism TLP.

Figure 7:
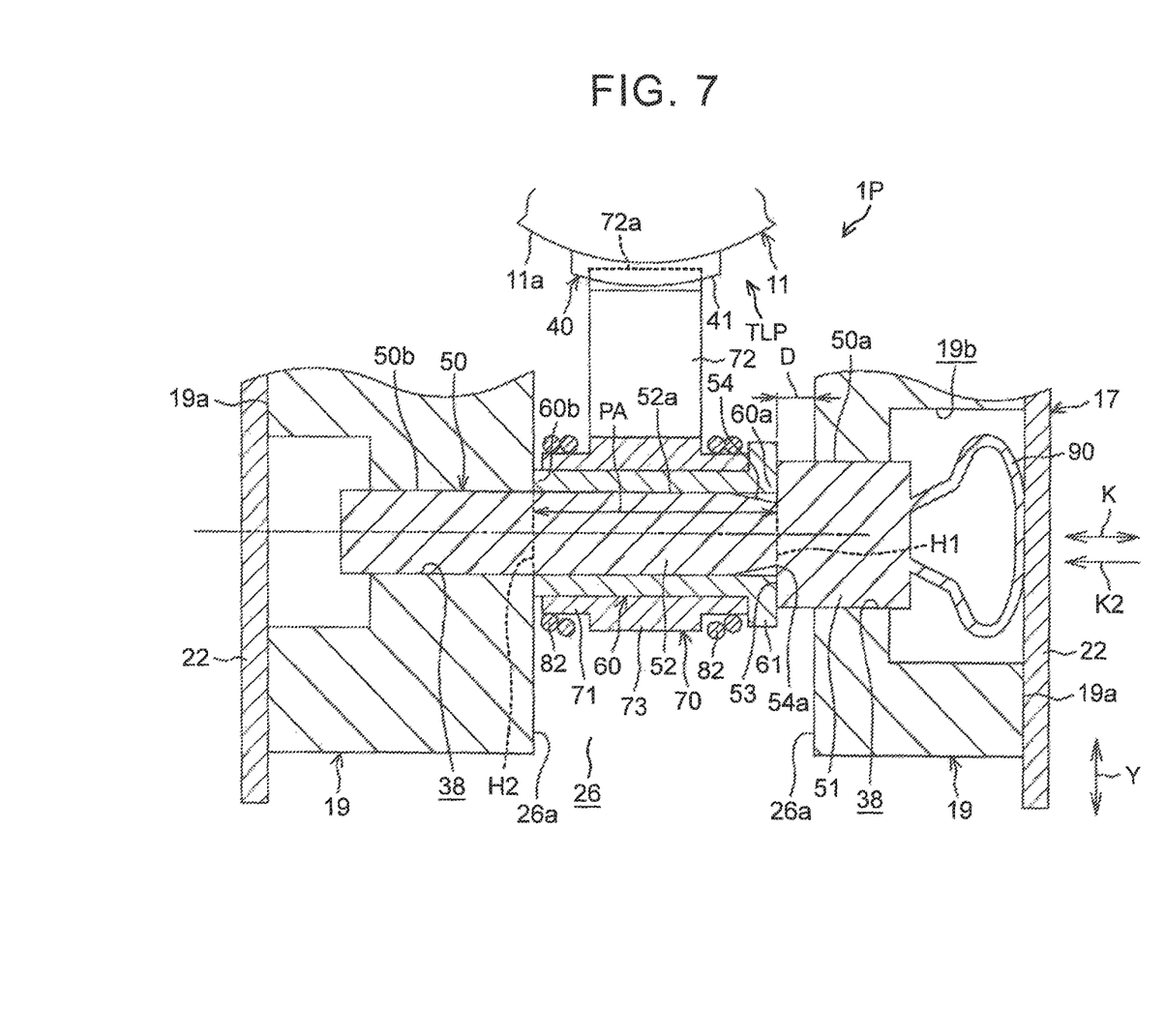
FIG. 7 is a sectional view of an essential part of a steering apparatus according to a second embodiment of the present disclosure, and illustrates a mechanism that supports a second tooth formation member of a tooth lock mechanism.

The second embodiment in FIG. 7 is mainly different from the first embodiment in FIG. 6 in the following point. That is, a boss portion 71 of the second tooth formation member 70 is supported rotatably via a tubular reinforcing member 60. The reinforcing member 60 is fitted to a predetermined region PA of an outer peripheral surface 52a of a small-diameter portion 52 of a support shaft 50. A first to-be-broken portion H1 and a second to-be-broken portion H2 are placed on both sides of the predetermined region PA of the support shaft 50 reinforced by the fitting of the reinforcing member 60.

The reinforcing member 60 is provided between a stepped portion 53 of the support shaft 50 and an inner surface 26a of a slit 26 on the other-fastened-portion-19 side (a left side in FIG. 7). One end 60a of the reinforcing member 60 abuts with the stepped portion 53. More specifically, a flange 61 provided in the one end 60a of the reinforcing member 60 and extending radially outwardly abuts with the stepped portion 53. An end surface of the other end 60b of the reinforcing member 60 abuts with the inner surface 26a of the slit 26 on the other-fastened-portion-19 side.

The reinforcing member 60 has a strength higher than a strength of the support shaft 50, so as to strengthen a reinforcement degree to the predetermined region PA. In a case where the support shaft 50 is made of resin, a resin member or a metal member having a strength higher than resin forming the support shaft 50 may be used as the reinforcing member 60. The reinforcing member 60 is a collar, for example. According to the present embodiment, similarly to the first embodiment, due to the action of the tapered portion 54, the first to-be-broken portion H1 and the second to-be-broken portion H2 can be broken by shearing at the same time, thereby making it possible to achieve a stable impact absorption load.

Further, there is a strength difference between a part, of the support shaft 50, to which the reinforcing member 60 is fitted and each of the to-be-broken portions H1, H2 on both sides of the reinforcing member 60. This promotes the breakage of the to-be-broken portions H1, H2 at the time of a secondary collision, thereby making it possible to more surely break the to-be-broken portions H1, H2. Further, the reinforcing member 60 has a strength higher than that of the support shaft 50. This accordingly increases the strength difference between a part, of the support shaft 50, which is reinforced by the fitting of the reinforcing member 60 having a high strength and each of the to-be-broken portions H1, H2 on both sides of the reinforcing member 60. Accordingly, the to-be-broken portions H1, H2 are surely broken by shearing at the time of a secondary collision. This makes it possible to achieve as stable impact absorption as possible.

The present disclosure is not limited to the above embodiment. For example, the steering apparatus 1 is not limited to a manual-type steering apparatus, but may be an electric power steering apparatus that assists steering by giving power of an electric motor to the steering shaft 3. In addition, the present disclosure can be modified variously within a scope of claims of the present disclosure.

What is claimed is:

1. A steering apparatus comprising:
a column jacket including a steering shaft stretchable in a column axial direction, an outer jacket including a slit and a pair of fastened portions placed on both sides of the slit, and an inner jacket fitted to the outer jacket, the column jacket being configured to rotatably support the steering shaft and to be stretchable in the column axial direction;
a fastening mechanism including a fastening shaft passed through fastening shaft passing holes of the pair of fastened portions, and an operating lever rotating the fastening shaft, the fastening mechanism being configured to fasten the pair of fastened portions via the fastening shaft so that the outer jacket holds the inner jacket;
a first tooth formation member forming first teeth and fixed to the inner jacket;
a support shaft including a first supported portion and a second supported portion supported by respective support holes of the pair of fastened portions; and
a second tooth formation member including a second tooth engaging with a corresponding one of the first teeth, the second tooth formation member being rotatably supported by the support shaft so as to rotate according to an operation of the operating lever such that the second tooth engages with or disengages from the corresponding one of the first teeth, wherein:
the support shaft includes a large-diameter portion partially including the first supported portion in a support shaft direction, a small-diameter portion partially including the second supported portion in the support shaft direction and having a diameter smaller than the large-diameter portion, and a stepped portion formed between the large-diameter portion and the small-diameter portion; and
the small-diameter portion includes a tapered portion provided in the small-diameter portion so as to be adjacent to the stepped portion and having a diameter gradually decreasing toward the stepped portion, a first to-be-broken portion placed in a smallest-diameter portion of the tapered portion so as to be broken at a time of a secondary collision, and a second to-be-broken portion placed adjacent to the second supported portion so as to be broken at the time of the secondary collision.

2. The steering apparatus according to claim 1 further comprising
a reinforcing member configured to be fitted to an outer peripheral surface of the small-diameter portion between the first to-be-broken portion and the second to-be-broken portion, the reinforcing member being formed in a tubular shape and having a strength higher than a strength of the support shaft, wherein
the second tooth formation member is supported by the support shaft via the reinforcing member.

* * * * *